United States Patent [19]

Miller et al.

[11] Patent Number: 5,006,713
[45] Date of Patent: Apr. 9, 1991

[54] ALPHA PROBE

[75] Inventors: John C. Miller, Horsham; Sudhakar Pandey, Newtown; Earl M. Pollock, Chalfont, all of Pa.

[73] Assignee: Nuclear Research Corp., Warrington, Pa.

[21] Appl. No.: 402,602

[22] Filed: Sep. 5, 1989

[51] Int. Cl.$^5$ .............................................. G01T 1/20
[52] U.S. Cl. ................................. 250/361 R; 250/253
[58] Field of Search .................. 250/361 R, 253, 368, 250/369, 484.1 B, 370.02, 370.11, 363.01, 327.2 F, 327.2 G

[56] References Cited

U.S. PATENT DOCUMENTS

| 2,841,715 | 7/1958 | Schultz | 250/368 |
| 3,448,276 | 6/1969 | Witte | 250/216 |
| 3,950,647 | 4/1976 | Piltingsrud | 250/361 R |
| 4,107,534 | 8/1978 | Piltingsrud | 250/368 |
| 4,562,354 | 12/1985 | Keller et al. | 250/388 |

FOREIGN PATENT DOCUMENTS

| 55-82070 | 6/1980 | Japan | 256/368 |
| 55-82071 | 6/1980 | Japan | 250/368 |

Primary Examiner—Constantine Hannaher
Assistant Examiner—Edward J. Glick
Attorney, Agent, or Firm—Walter B. Udell

[57] ABSTRACT

An alpha particle radiation probe which eliminates the need for any intermediate light coupling devices between the scintillation generating phosphor and scintillation detector while at the same time providing uniform response to alpha particles over a substantially larger area than has heretofore been possible on the order of 100 cm$^2$ to 150 cm$^2$. The structure is arranged to quickly replace a light blocking screen that has been damaged in use. Significant reductions in weight and cost are also achieved because of the simpler construction and the elimination of the light coupling devices heretofore used. The apparatus eliminates the need for a second small aperture probe detector for localizing radiation hot spots by providing aperture reducing means quickly attachable to and detachable from the scanning window to reduce its aperture and provide the hot spots detection function simply and inexpensively.

4 Claims, 1 Drawing Sheet

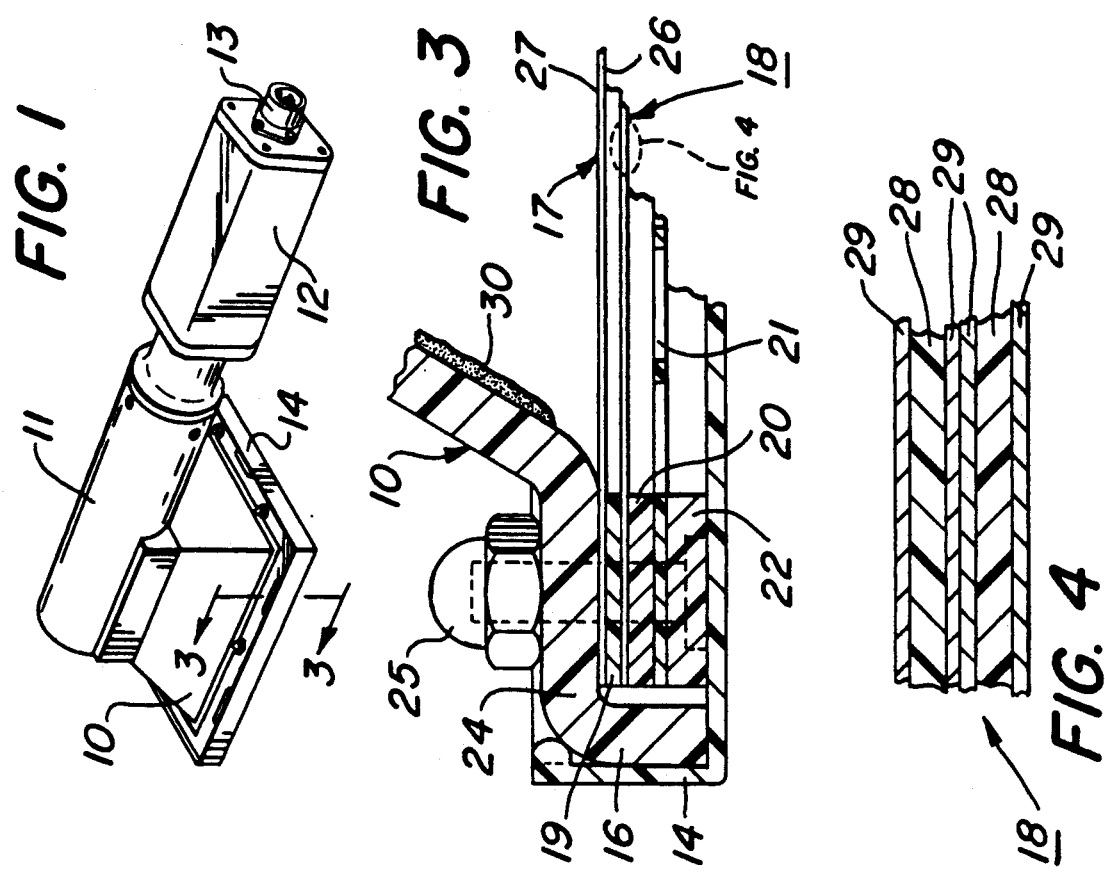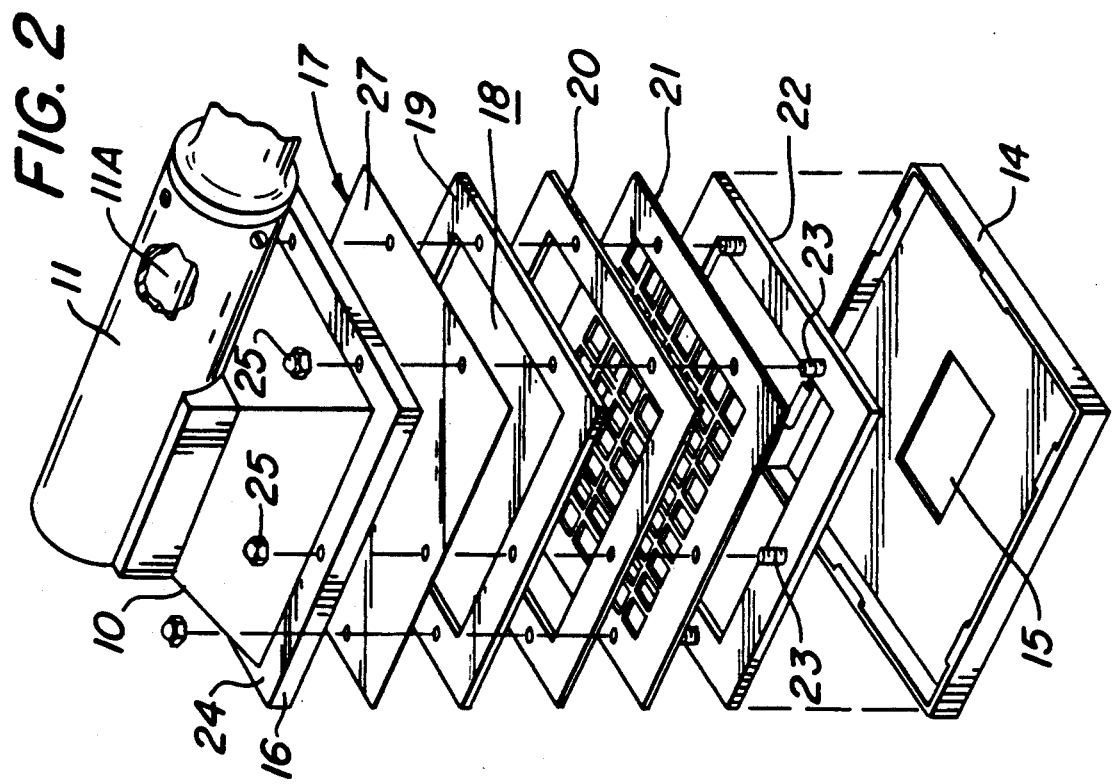

ns to the weight of the structure and also
ALPHA PROBE

This invention relates generally to radiation detecting devices, and more particularly relates to devices for measuring alpha particle radiation.

BACKGROUND OF THE INVENTION

Alpha probes are devices which utilize an alpha particle sensitive screen to produce scintillations in response to impingement by alpha particles, the scintillations then being usually transmitted to a photo responsive device such as a photo-multiplier tube by means of intervening light coupling devices such as lens systems, light pipes and prisms. These light coupling devices add considerably to the weight of the structure and also restrict the viewing area. Such known devices typically weigh in the range of 1 ½ to 2 ½ lbs., and are limited in surface detection area to scanning response surfaces generally in the range from 20 $cm^2$ to 50 $cm^2$. Such devices must be positioned as closely as possible to the contaminated surface being scanned because alpha particles have energies in the range from 0–5 mev and lose about 1 mev per centimeter of travel through air. When scanning irregular surfaces such as the ground, contact with grass and sticks can cause damage to the device by poking holes in the light blocking screen which shields the alpha particle responsive screen. Such holes allow light through to the photo-multiplier tube and generate false high readings. With the known devices, it is quite time consuming and cumbersome to replace the light shielding screen in the device in order to again render it operative.

SUMMARY OF THE INVENTION

The apparatus according to the invention eliminates these problems in that it provides a much simpler device by eliminating entirely the intermediate light coupling devices from between the scintillation generating phosphor and the photo-multiplier tube, while at the same time providing uniform response to alpha particles over a substantially larger area than has heretofore been possible, on the order of 100 $cm^2$ to 150 $cm^2$. Further, the structure is so arranged that it is a simple matter to quickly replace a light blocking screen that has been damaged in use. Significant reductions in weight and cost are also achieved because of the simpler construction and the elimination of the light coupling devices heretofore used.

Additionally, when scanning encounters a high reading area, it has in the past been the practice to then scan that larger area with a small probe in order to localize hot spots of radiation. This of course required a second detector device. The apparatus according to the invention eliminates the need for a second probe detector by providing aperture reducing means quickly attachable to and detachable from the scanning window to reduce its aperture and provide the hot spots detection function simply and inexpensively. Accordingly, it is a primary object of the invention to provide a novel radiation detector which is simpler in construction than the known prior devices, which is significantly lighter in weight and is less expensive.

Another object of the invention is to provide a novel radiation detector as aforesaid which is characterized by substantially increased sensitivity through the ability to utilize large surface detection areas several times larger than those heretofore known.

Another object of the invention is to provide a novel radiation detector as aforesaid in which the components of the device which are subject to damage in use, such as the light blocking screen and the scintillator, are quickly and easily replaceable in the field.

Yet a further object of the invention is to provide a novel radiation detector as aforesaid which eliminates the need for light coupling devices such as lens systems, light pipes and prisms.

The foregoing and other objects of the invention will become clear from a reading of the following specification in conjunction with an examination of the appended drawings, wherein:

BRIEF DESCRIPTION OF THE DRAWINGS

FIG. 1 is an isometric view from above and to one side of the novel radiation detector according to the invention;

FIG. 2 is a view similar to that of FIG. 1 but with the several component parts shown in exploded view arrangement;

FIG. 3 is a vertical sectional view, on an enlarged scale, through a corner of the scintillation chamber, as would be seen when viewed along the lines 3—3 on FIG. 1, showing the assembled relationship of the component parts of the assembly; and FIG. 4 is an enlarged fragmentary cross section of the aluminized window part of the apparatus as would be seen in the phantom circle denoted 4 on FIG. 3.

In the several figures, like elements are denoted by like reference characters.

DESCRIPTION OF THE PREFERRED EMBODIMENT

As is shown in the several figures, the apparatus consists of a rectangular funnel type scintillation chamber designated generally as 10 fixedly mounted to a photomultiplier tube housing 11 within which is disposed a photomultiplier tube 11A scintillation detector. Removably secured to the end of the photo-multiplier tube housing 11 is a preamplifier unit 12 having a shielded cable output coupling 13 at its free end for attachment of a signal cable to carry the detected amplified signals from the radiation detector to further apparatus for processing the detected signals. Snap fitted over the face of the scanner is a protective cover 14 made of any material which is opaque to the radiation being detected, such as alpha particles. This protective cover 14, or an entirely separate snap-on cover if so desired, is provided with a reduced area window 15 which functions as a hotspot detector by reducing the viewing aperture for the detector apparatus from perhaps the 120 $cm^2$ of the scintillation chamber mouth to 10 $cm^2$. In the illustrated case, the window shape could be substantially rectangular, as would typically be the shape of the mouth and neck of the scintillation chamber 10 to provide the proper configuration for maximizing the scintillation signal input to the side window photomultiplier tube, which typically could be an RCA 931B having a rectangular target of about 1.3 cm by 2.5 cm.

As best seen in FIGS. 2 and 3 the scintillation chamber 10 has a perimeterally extending down-turned flange 16, disposed within and secured to which is a five part planar assembly consisting of a scintillator 17 beneath which is disposed an aluminized window 18 mounted on a frame 19, a sponge rubber gasket 20 placed at the underside of the aluminized window 18 and below which are respectively disposed a protective grille 21 and a retainer frame 22. The retainer frame 22 is provided with a plurality of threaded studs 23 extending upward from the inner surface of the retainer frame, the studs passing through correspondedingly located holes in the above-lying elements and passing through the edge 24 of the scintillation chamber 10 where the studs are secured by cap nuts 25.

The scintillator 17 is made from a piece of 2 ½ mil mylar film, the lower surface of which is coated with a scintillation phosphor, which typically could be silver activated zinc sulfide, designated at 26 in FIG. 3, the upper side 27 being uncoated. The below lying aluminized window 18 is made from a piece of 0.08 mil polycarbonate film coated with aluminum thickly enough to be opaque to the light spectrum to which the photomultiplier tube is responsive. The window 18 is tightly stretched and fastened to the frame 19, which latter acts as a spacer between the window 18 and the zinc sulfide coated surface 26 of the scintillator 17, the frame being approximately 1/32" thick. The spacer frame 19 prevents the zinc sulfide from scratching or perforating the aluminized coating of the window in order to prevent such scratches or perforations from allowing light to enter the photomultiplier tube and giving false readings. In order to minimize this occurrence, and to also guard against possible pin holes in the aluminized coating, two stacked aluminized films are utilized so that the probability of coincident pin holes is substantially eliminated. This configuration is shown in the detailed enlargement of FIG. 4 in which are seen the two separate polycarbonate films 28 coated on each surface with the aluminum coatings 29.

The protective grille 21 would typically be made of stainless steel and the side facing the aluminized window must be smooth, as for example accomplished by electro etching, or if punched, the smooth side must be facing the aluminized window. The sponge rubber gasket 20 provides some spacing between the protective grille and the aluminized window. The scintillation chamber 10, housing 11 and preamplifier case 12 may be made of vacuum formed or molded plastic, but could be of any desired opaque material to prevent light from entering the photo-multiplier tube. The inside surfaces of the chamber are coated with a light reflective dispersive coating 30 such as paint with titanium dioxide pigment, which produces a non-gloss highly reflective dispersive matte finish.

Having now described the invention in connection with a particularly illustrated embodiment thereof, variations and modifications of the invention may now naturally occur from time to time to those persons normally skilled in the art without departing from the essential scope and spirit of the invention, and accordingly it is intended to claim the same broadly as well as specifically as indicated by the appended claims.

We claim:

1. A large aperture alpha radiation detector device comprising in combination,
   (a) a rectangular single funnel scintillation chamber having a large rectangular mouth area opening where scintillations are generated, and having a substantially smaller neck area opening where the target of a scintillation detector may be disposed to directly view the funnel mouth with no other physical structure disposed between the funnel mouth opening and neck opening and to generate signals in response to viewed scintillations, the inside surface of said scintillation chamber between said mouth opening and neck opening being coated with a highly reflective light dispersive coating.
   (b) a side window photomultiplier tube scintillation detector disposed in a housing affixed to the neck end of said scintillation chamber with the scintillation detector target disposed as aforesaid at the funnel neck opening,
   (c) a flat screen scintillator of substantially the same area as and positioned at the scintillation chamber mouth with its plane substantially orthogonal to the funnel axis, said scintillator being responsive to alpha particles radiation,
   (d) a flat window of substantially the same size as, and with its plane parallel spaced closely to, but separated from, said scintillator, and facing the side of said scintillator which faces the mouth of said scintillation chamber, said window being transparent to alpha particles radiation but opaque to light to which said scintillation detector is responsive, and
   (e) quick release retainer means operative to securely detachably lock scintillator and flat window to said scintillation chamber across the mouth of and closing said scintillation chamber.

2. Apparatus as set forth in claim 1 wherein said quick release retainer means comprises a retainer frame spaced outward beyond said scintillator and flat window, resilient compression means arranged in a sandwich with said window and scintillator, and quick detachable locking means operative to lock said retained frame to the periphery of said scintillation chamber and firmly clamp said sandwich of said scintillator, said flat window and said resilient compression means to the periphery of said scintillation chamber.

3. Apparatus as set forth in claim 1 further including aperture reducing means quickly attachable to and detachable from said detector device to reduce the scanning aperture size for quickly locating radiation hotspots, said aperture reducing means being physically positioned outward of the side of said flat window which faces away from said scintillation chamber mouth.

4. Apparatus as set forth in claim 1 further including a protective grille spaced outwardly from and extending across the face of said flat window.

* * * * *